(12) United States Patent
Mei

(10) Patent No.: US 11,185,003 B2
(45) Date of Patent: Nov. 30, 2021

(54) TIPPING AVOIDANCE SYSTEM AND METHOD

(71) Applicant: Caterpillar Inc., Deerfield, IL (US)

(72) Inventor: Barry Mei, Oswego, IL (US)

(73) Assignee: Caterpillar Inc., Peoria, IL (US)

(*) Notice: Subject to any disclaimer, the term of this patent is extended or adjusted under 35 U.S.C. 154(b) by 272 days.

(21) Appl. No.: 16/373,818

(22) Filed: Apr. 3, 2019

(65) Prior Publication Data
US 2020/0315083 A1 Oct. 8, 2020

(51) Int. Cl.
| | | |
|---|---|---|
| *A01B 69/00* | (2006.01) | |
| *A01D 75/28* | (2006.01) | |
| *B60W 50/14* | (2020.01) | |
| *B60W 10/18* | (2012.01) | |
| *B66F 17/00* | (2006.01) | |

(52) U.S. Cl.
CPC ............ *A01B 69/00* (2013.01); *A01D 75/28* (2013.01); *B60W 10/18* (2013.01); *B60W 50/14* (2013.01); *B66F 17/00* (2013.01)

(58) Field of Classification Search
CPC .................................................... A01B 69/00
See application file for complete search history.

(56) References Cited

U.S. PATENT DOCUMENTS

| | | | |
|---|---|---|---|
| 5,361,211 A | 11/1994 | Lee et al. | |
| 5,499,684 A | 3/1996 | Stratton | |
| 5,560,551 A | 10/1996 | Suverkrop | |
| 6,437,701 B1 | 8/2002 | Muller | |
| 6,889,140 B2 * | 5/2005 | Isogai | B60T 8/17558 701/301 |
| 8,244,409 B2 * | 8/2012 | Bergsten | B60T 8/1766 701/1 |
| 8,560,181 B2 | 10/2013 | Ekvall et al. | |
| 9,206,026 B2 * | 12/2015 | Aulton | B66F 9/24 |
| 9,348,327 B2 * | 5/2016 | Mizuochi | B60P 1/045 |
| 9,708,793 B2 * | 7/2017 | Matsuzaki | E02F 9/2087 |
| 10,882,518 B2 * | 1/2021 | Saiki | B62D 15/0265 |
| 2004/0199327 A1 * | 10/2004 | Isogai | B60K 31/0008 701/301 |

(Continued)

FOREIGN PATENT DOCUMENTS

| | | |
|---|---|---|
| EP | 2511677 A1 | 10/2012 |
| JP | WO2013191017 A1 | 12/2013 |

*Primary Examiner* — Alex C Dunn
(74) *Attorney, Agent, or Firm* — Lee & Hayes, PLLC

(57) ABSTRACT

A tipping avoidance system configured to modify operation of a collision avoidance system. The tipping avoidance system may include a payload determination system configured to generate a payload signal, and a load position determination system configured to generate a load position signal. The tipping avoidance system may also include a tipping avoidance controller configured to receive the payload signal and the load position signal, and determine, based at least in part on the payload signal and the load position signal, a minimum stopping distance at or above which the machine will not tip due at least in part to deceleration of the machine from a travel speed to a stopped condition. The tipping avoidance controller may be configured to communicate with a braking controller, such that the braking controller adjusts a stop triggering distance based at least in part on the minimum stopping distance.

20 Claims, 4 Drawing Sheets

(56) References Cited

U.S. PATENT DOCUMENTS

| | | | | |
|---|---|---|---|---|
| 2014/0121840 A1* | 5/2014 | Mizuochi | ............... | G05B 17/02 |
| | | | | 700/275 |
| 2015/0045992 A1* | 2/2015 | Ashby | ................. | G05D 1/0287 |
| | | | | 701/2 |
| 2017/0203758 A1* | 7/2017 | Mukai | ............... | B60W 30/0956 |
| 2017/0358209 A1* | 12/2017 | Ohmori | ..................... | B60T 7/22 |
| 2019/0100197 A1* | 4/2019 | Saiki | ........................ | B60T 7/22 |
| 2020/0310451 A1* | 10/2020 | Zhu | ..................... | G05D 1/0223 |

* cited by examiner

TIPPING AVOIDANCE SYSTEM AND METHOD

TECHNICAL FIELD

The present disclosure relates to a system and method for avoiding tipping of a machine during braking, and more particularly, to a system and method for avoiding tipping of a machine during braking associated with a collision avoidance system.

BACKGROUND

A mobile machine may include a collision avoidance system to prevent unintended collisions with objects, such as other machines, people, or structures. A collision avoidance system may include a sensor for sensing objects and may apply one or more braking devices to prevent the machine from colliding with a sensed object. However, some types of machines may undesirably tip forward in the direction of travel if a braking device is applied in a manner that creates an unstable condition associated with the machine.

An attempt to control a braking force of a vehicle is described in U.S. Pat. No. 8,244,409 B2 to Bergsten ("the '409 patent"), issued Aug. 14, 2012. Specifically, the '409 patent describes a method and a system for controlling the braking force of the vehicle. The method includes the steps of detecting at least one operating parameter of the vehicle and detecting a position of an operator controlled braking element. The method also includes the steps of determining a magnitude of a braking force on the basis of a detected magnitude of the operating parameter and the detected position of the operator controlled braking element, and braking the vehicle according to the determined braking force.

Although the '409 patent purports to provide a method that prevents the operator from ordering a braking action that will cause tip-over of the machine, the method of the '409 patent does not relate to or affect operation of braking associated with a collision avoidance system. The systems and methods disclosed herein may be directed to mitigating or overcoming one or more of the possible drawbacks set forth above.

SUMMARY

According to a first aspect, a tipping avoidance system may include a payload determination system configured to generate a payload signal indicative of a payload carried by the machine. The tipping avoidance system may also include a load position determination system configured to generate a load position signal indicative of a position of the payload relative to the machine. The tipping avoidance system may further include a tipping avoidance controller configured to receive the payload signal, receive the load position signal, and determine, based at least in part on the payload signal and the load position signal, a minimum stopping distance at or above which the machine will not tip due at least in part to deceleration of the machine from a travel speed at which the machine is traveling to a stopped condition. The tipping avoidance controller may also be configured to communicate with a braking controller, such that the braking controller adjusts a stop triggering distance based at least in part on the minimum stopping distance.

According to a further aspect, a control system for a machine may include a collision avoidance system configured to assist the machine with avoiding a collision between the machine and an object in an environment through with the machine maneuvers along a path. The collision avoidance system may include at least one object sensor configured to generate an object signal indicative of an object, and a braking controller configured to control activation of a braking device coupled to the machine, with the braking controller being configured to reduce a travel speed at which the machine maneuvers. The collision avoidance system may also include an avoidance controller configured to receive the object signal from the at least one object sensor. Based at least in part on the object signal, the avoidance controller may also be configured to activate the braking device, such that the travel speed of the machine is at least one of reduced or stopped. The control system may also include a tipping avoidance system configured to modify operation of the collision avoidance system. The tipping avoidance system may include a tipping avoidance controller configured to receive a payload signal indicative of a payload carried by the machine, receive a load position signal indicative of a position of the payload relative to the machine, and determine, based at least in part on the payload signal and the load position signal, a minimum stopping distance at or above which the machine will not tip due at least in part to deceleration of the machine from the travel speed at which the machine is traveling to a stopped condition. The tipping avoidance controller may also be configured to communicate with the braking controller, such that the braking controller adjusts a stop triggering distance based at least in part on the minimum stopping distance.

According to another aspect, a method for modifying operation of a collision avoidance system associated with a machine may include receiving a payload signal indicative of a payload carried by a machine and receiving a load position signal indicative of a position of the payload relative to the machine. The method may also include determining, based at least in part on the payload signal and the load position signal, a minimum stopping distance at or above which the machine will not tip due at least in part to deceleration of the machine from a travel speed at which the machine is traveling to a stopped condition, and communicating with a braking controller, such that the braking controller adjusts a stop triggering distance based at least in part on the minimum stopping distance.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
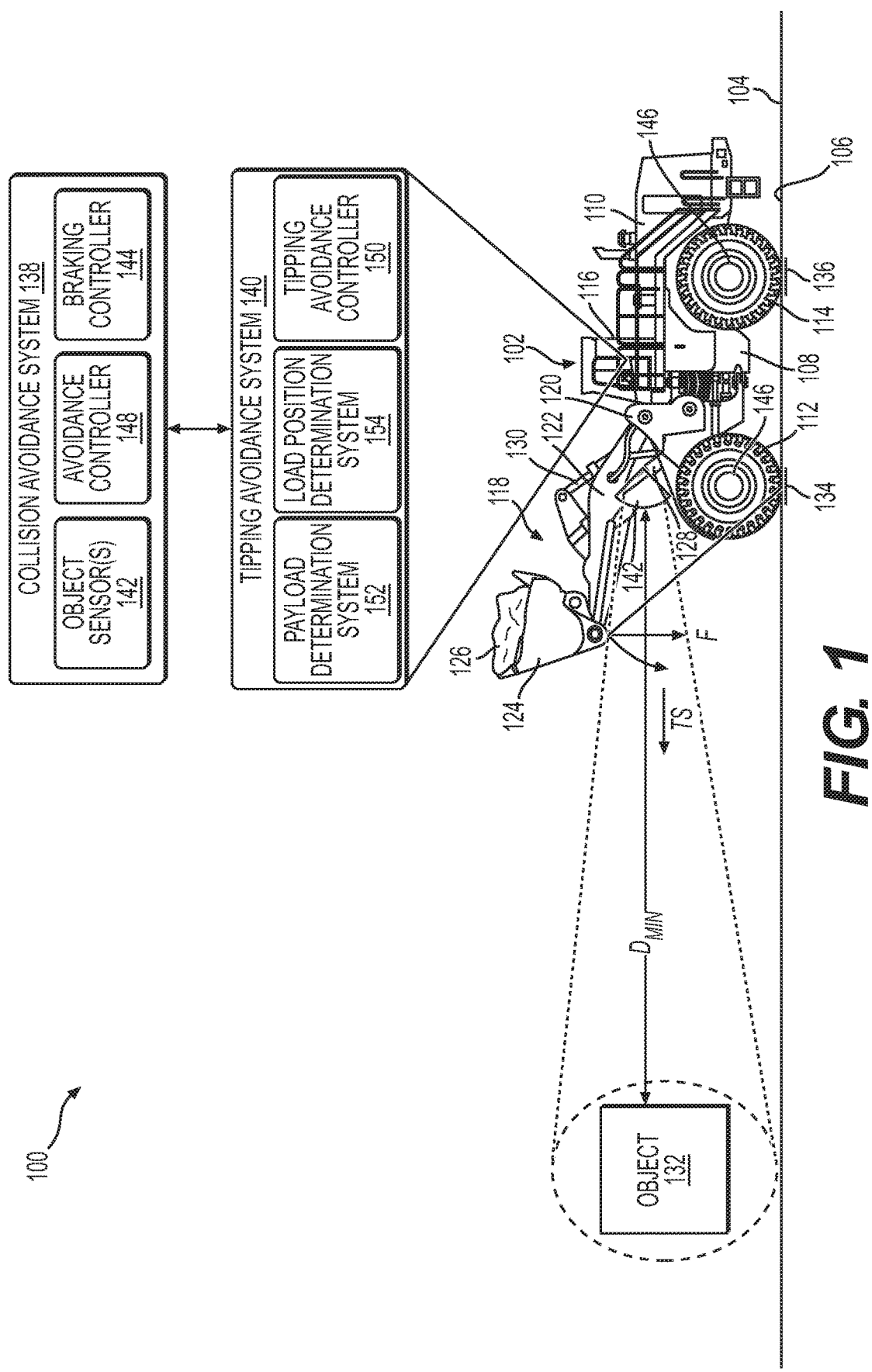
FIG. 1 is a schematic side view of an example machine, including an example collision avoidance system and an example tipping avoidance system, operating in an example environment.

FIG. 1 schematically depicts an example environment 100 in which an example machine 102 operates. Example environment 100 includes example terrain 104 having a ground plane 106, which, in the example shown, is substantially horizontal or level. Ground planes oriented at an angle relative to horizontal or level are contemplated. Example machine 102 shown in FIG. 1 is an example wheel loader. However, machine 102 may be any type of machine configured to travel across terrain, such as, for example, an automobile, a truck, an agricultural vehicle, and/or work vehicles, such as, for example, a wheel loader, a track loader, a dozer, a skid-steer loader, a grader, an on-highway truck, an off-highway truck, and/or any other machine known to a person skilled in the art. Example machine 102 shown in FIG. 1 includes a chassis 108 to which is coupled a power source 110 to supply power for operation of machine 102, including, for example, operating work implements, electronics, and steering, and/or for supplying torque to drive members to propel machine 102 across terrain 104. For example, machine 102 includes front wheels 112 (only one shown) and rear wheels 114 (only one shown) coupled to chassis 108 and configured to propel machine 102 across terrain 104. Although example machine 102 includes wheels 112 and 114, it is contemplated that machine 102 may include one or more tracks instead of, or in addition to, wheels 112 and 114. Example machine 102 also includes a cab 116 coupled to chassis 110 for protecting and/or providing comfort for an operator of machine 102 and/or for protecting control-related devices of machine 102. In some examples, machine 102 may be semi-autonomous or fully autonomous, for example, and may be able to operate without an onboard or remote operator. Example machine 102 also includes a work implement 118 for performing operations associated with machine 102, such as, for example, digging, shaving, smoothing, carrying, raising, and/or depositing material. For example, example machine 102 includes a frame 120 coupled to chassis 108, a boom 122 having a proximal end coupled to frame 120 and configured to pivot relative to frame 120, and a bucket 124 coupled to a distal end of boom 122 and configured to dig, carry, and/or deposit material 126 and pivot relative to boom 122. Material 126 may include earth, gravel, refuse, etc. Example machine 102 also includes a boom actuator 128 coupled at one end to chassis 110 and at an opposite end to boom 122 and configured to extend and retract, thereby raising and lowering the distal end of boom 122, respectively. Example machine 102 also includes a bucket actuator 130 coupled at one end to the proximal end of boom 122 and configured to extend and retract, thereby pivoting bucket 124 between an upright orientation, for example, for holding material 126 in bucket 124, and an at least partially inverted orientation, for example, for depositing or dumping material 126 from bucket 124. Other forms of work implements are contemplated.

As shown in FIG. 1, example machine 102 is operating on a relatively level ground plane 106 and is travelling right-to-left toward along a path to toward an object 132. Object 132 may be any type of object with which it would be desirable for machine 102 to avoid a collision, such as, for example, another machine, a structure such as a wall or building, a tree, etc. Machine 102 is supported by ground plane 106, which may be defined by a front contact surface 134 between front wheel 112 and terrain 104 supporting front wheel 112, and a rear contact surface 136 between rear wheel 114 and terrain 104 supporting rear wheel 114. In some examples, level operation of machine 102 may correspond to an axis extending between (1) front contact surface 134 between front wheel 112 of machine 102 and terrain 104 supporting front wheel 112, and (2) rear contact surface 136 between rear wheel 114 of machine 102 and terrain 104 supporting rear wheel 114, wherein, for example, the axis is substantially horizontal or level.

As shown in FIG. 1, example machine 102 includes an example collision avoidance system 138 and an example tipping avoidance system 140. Although FIG. 1 schematically depicts tipping avoidance system 140 as being separate from collision avoidance system 138, in some examples, all or portions of tipping avoidance system 140 may be part of (or integrated into) collision avoidance system 138. Example collision avoidance system 138 may be configured to assist an operator of machine 102 (e.g., aboard machine 102 or remote from machine 102), or an autonomous machine, with avoiding a collision between machine 102 and an object in environment 100 through which machine 102 maneuvers along a path. As shown in FIG. 1, some examples of collision avoidance system 138 may include one or more object sensors 142 configured to generate an object signal indicative of detection of an object. One or more object sensors 142 may include, for example, one or more imagers (e.g., one or more cameras), one or more light detection and ranging (LIDAR) sensors, one or more sound navigation ranging (SONAR) sensors, or one or more radio detection and ranging (RADAR) sensors, or any other suitable sensor type. In some examples, one or more object sensors 142 may be mounted to machine 102, for example, at a front end of machine 102, as shown in FIG. 1. It is contemplated that one or more object sensors 142 may be additionally, and/or alternatively, mounted at many different locations of machine 102.

Example collision avoidance system 138 shown in FIG. 1 also includes a braking controller 144 configured to control activation of one or more braking devices 146 coupled to machine 102 and configured to slow a travel speed of machine 102, stop machine 102, and/or hold machine 102 at a fixed location on terrain 104, for example, on an incline. For example, braking controller 144 may be configured to reduce a travel speed at which machine 102 maneuvers by activating one or more of braking devices 146. In some examples, collision avoidance system 138 may also include an avoidance controller 148 configured to receive the one or more object signals from one or more object sensors 142 and, in some examples, determine whether the object is in the path of machine 102. Based at least in part on the one or more object signals (e.g., upon determining the object is in the path), avoidance controller 146, in some examples, may be configured to activate one or more of one or more braking devices 146, for example, such that the travel speed of machine 102 is reduced and/or stopped. In this example manner, collision avoidance system 138 may sense an object in the path of machine 102 and upon detection of the object, cause activation of one or more of braking devices 146, for example, so that machine 102 avoids collision with the detected object and/or assists an operator of machine 102 with avoiding the detected object, for example, by slowing the travel speed of machine 102 and/or stopping machine 102 before machine 102 collides with the detected object.

In some examples, braking controller 144 may be configured, when activated by avoidance controller 148, to activate braking devices 146 according to one or more braking profiles. For example, the braking profiles may include an emergency stop profile configured to stop machine 102 at a maximum deceleration rate, and a comfort stop profile configured to stop machine 102 at a moderate deceleration rate intended to reduce discomfort to the operator. For example, the emergency stop profile may be activated when a distance to a detected object is less than a minimum emergency stopping distance $D_{MIN}$, which in some examples, may be predetermined or calculated real-time based on, for example, the travel speed of machine 102. For example, as shown in FIG. 1, if object sensor(s) 142 detect object 132 in the travel path of machine 102, and the distance between machine 102 and object 132 is the same as or less than the minimum emergency stopping distance $D_{MIN}$, then, in some examples, avoidance controller 148 may activate braking controller 144 and cause braking devices 146 to activate according to the emergency stop profile, which may result in a maximum braking force being applied (e.g., a maximum hydraulic pressure is applied to a hydraulic braking system). In some examples, if, alternatively, object sensor(s) 142 detect object 132 in the travel path of machine 102, and the distance between machine 102 and object 132 is greater than the minimum emergency stopping distance $D_{MIN}$, then, in some examples, avoidance controller 148 may activate braking controller 144 and cause braking devices 146 to activate according to the comfort stop profile sufficient to stop machine prior to contact with object 132, but which may result in an intermediate level of braking force being applied (e.g., a hydraulic pressure less than maximum is applied to a hydraulic braking system). More and different braking profiles are contemplated.

Under certain circumstances, for example, depending one or more of payload, load position, or other parameters, braking of machine 102 by collision avoidance system 138 may result in machine 102 tipping forward in the direction of travel. For example, as shown in FIG. 1, if machine 102 is travelling forward (e.g., from right-to-left as shown) at a travel speed TS and carrying a payload of material 126, if deceleration due to braking is sufficiently high, machine 102 may have a tendency to tip forward, for example, rotating about front contact surface(s) 134 between front wheel(s) 112 and terrain 104, such that rear wheel(s) 114 lift off terrain 104, which is undesirable.

As shown in FIG. 1, machine 102, in some examples, may include tipping avoidance system 140, which may be configured to modify operation of collision avoidance system 138, for example, and reduce the likelihood or prevent braking due to operation of collision avoidance system 138 from causing machine 102 to tip forward, such that machine 102 rotates about front contact surface(s) 134 between front wheel(s) 112 and terrain 104, such that rear wheel(s) 114 lift off terrain 104. For example, as shown in FIG. 1, some examples of tipping avoidance system 140 may include a tipping avoidance controller 150 configured to be in communication with braking controller 144 and/or collision avoidance system 138. In some examples, tipping avoidance controller 150 may be configured to receive a payload signal indicative of a payload carried by machine 102. For example, as shown in FIG. 1, tipping avoidance system 140 may include a payload determination system 152 configured to generate a signal indicative of a payload carried by machine 102, such as, for example, weight of material 126 carried in bucket 124 (e.g., a force F due to gravity). In some examples, tipping avoidance controller 150 may be configured to receive a load position signal indicative of a position of the payload relative to machine 102. For example, as shown in FIG. 1, tipping avoidance system 140 may include a load position determination system 154 configured to generate a signal indicative of a load position of the payload carried by machine 102, such as, for example, a location relative to machine 102 of material 126 carried in bucket 124. The position of the load carried by machine 1092 may affect the center of gravity of machine 102, which may, in turn, affect the tendency of machine 102 to tip forward when braking.

In some examples, tipping avoidance controller 150 may be configured to determine, based at least in part on the payload signal and the load position signal, a minimum stopping distance at or above which machine 102 will not tip due at least in part to deceleration of machine 102 from the travel speed at which machine 102 is traveling to a stopped condition. In some examples, the minimum stopping distance may be calculated real-time based on known principles of physics and information obtained from sensors associated with machine 102, and/or may be empirically determined based on, for example, testing and/or known principles of physics. When the minimum stopping distance is at least partially empirically determined, empirically-based minimum stopping distances may be correlated with machine-related parameters in one or more look-up tables, for example, as described herein, and the minimum stopping distance may be determined based on one or more of the machine-related parameters. In some such examples, tipping avoidance controller 150 may be configured to communicate with collision avoidance system 138, such that collision avoidance system 138 adjusts a stop triggering distance based at least in part on the minimum stopping distance. For example, the stop triggering distance may correspond to (e.g., may be equal to or equal to as modified by a safety factor) the minimum stopping distance, and may be the distance at which, when object sensor(s) 142 detect object 132 in the travel path of machine 102, collision avoidance system 138 causes activation of braking devices 146 to stop machine 102. In some examples, tipping avoidance controller 150 may communicate with collision avoidance system 138, such that braking controller 144 does not cause braking devices 146 to attempt to stop machine 102 in a distance less than or equal to the minimum stopping distance. In some examples, braking controller 144 may activate braking devices 146 according to a tipping avoidance profile, such that braking devices 146 do not attempt to stop machine 102 in a distance less than or equal to the minimum stopping distance.

For example, collision avoidance system 138 may be configured to cause braking controller 144 to activate one or more of braking devices 146 upon detection of an object once the object is within a stop triggering distance. For example, as machine 102 approaches a detected object, avoidance controller 148 may not cause braking controller to activate one or more of braking devices 146 until the detected object is within the stop triggering distance. In such example instances, braking controller 144 may activate one or more of braking devices 146 according to any one or more braking profiles, such as, for example, the emergency stop profile or the comfort stop profile described herein. In some examples, one or both the emergency stop profile or the comfort stop profile, when activated, may cause one or more of braking devices 146 to stop machine 102 prior to reaching the detected object, for example, in a stopping distance less than the minimum emergency stopping distance $D_{MIN}$. In some such examples, the stop triggering distance is greater than or equal to the minimum emergency stopping distance $D_{MIN}$.

In some examples, tipping avoidance system 138 may be configured to communicate with braking controller 144 (e.g., via collision avoidance system 138), such that braking controller 144 increases the stop triggering distance to be at least equal to or greater than the minimum stopping distance determined by tipping avoidance system 138, for example, to reduce the likelihood or prevent machine 102 from tipping forward in the direction of travel while decelerating from the travel speed TS to a stopped condition. In some examples, the lengthened stop triggering distance may be less than or equal to the minimum emergency stopping distance $D_{MIN}$, but greater than a stopping distance that would be expected to be achieved using the emergency stop profile and/or the comfort stop profile. In some examples, the lengthened stop triggering distance may be less than or equal to the minimum emergency stopping distance $D_{MIN}$ and greater than a stopping distance that would be expected to be achieved using the emergency stop profile, but less than or equal to the stopping distance that would be expected to be achieved using the comfort stop profile. In some examples, the lengthened stop triggering distance may be greater than or equal to the minimum emergency stopping distance $D_{MIN}$, and greater than a stopping distance that would be expected to be achieved using the emergency stop profile and/or the comfort stop profile.

Figure 2:
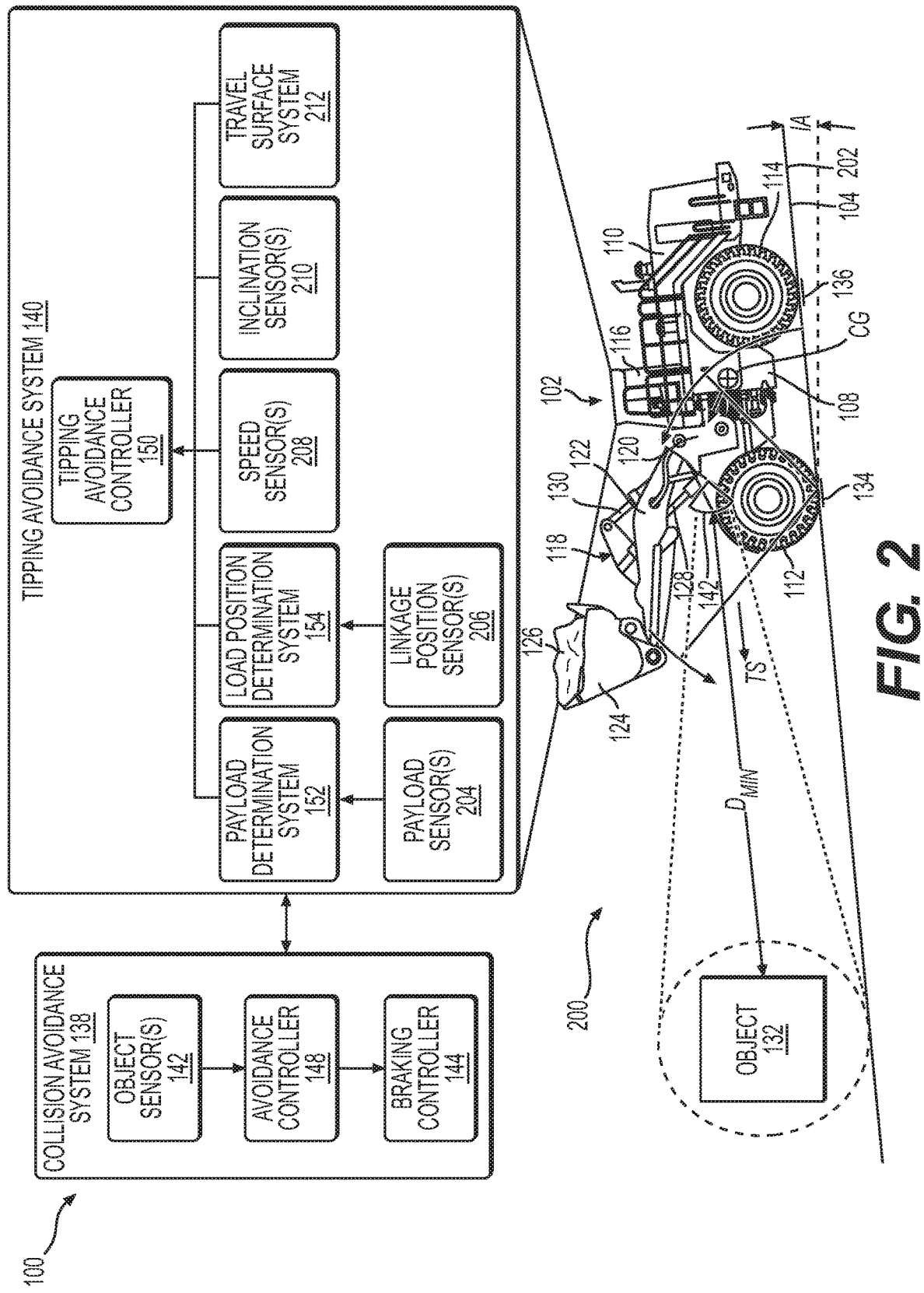
FIG. 2 is a schematic side view of an example machine, including an example collision avoidance system and an example tipping avoidance system, operating on an example incline.

FIG. 2 is a schematic side view of an example machine 102, including an example collision avoidance system 138 and an example tipping avoidance system 140, operating in an example environment 200 on an example incline 202 of terrain 104 having an incline angle IA relative to level or horizontal. At least similar to FIG. 1, example tipping avoidance system 140 includes tipping avoidance controller 150, payload determination system 152, and load position determination system 154. In some examples, as shown in FIG. 2, tipping avoidance system 140 may also include (and/or receive one or more signals from) one or more payload sensor(s) 204 configured to generate one or more signals indicative of a payload (e.g., the weight of material 126) carried by bucket 124. For example, boom actuator 128 and/or bucket actuator 130 may include one or more hydraulic cylinders configured to extend and/or retract in order to raise and lower boom 122 relative to frame 120 and/or in order to tilt bucket 124 down and/or upright. One or more pressure sensors associated with boom actuator 128 and/or one or more pressure sensors associated with bucket actuator 130 may generate signals indicative of pressure in one or more of the hydraulic cylinders, which may be indicative of the payload carried by bucket 124. Other methods of determining payload are contemplated, such as estimations based at least in part on, for example, material type, material density, and/or volume of bucket 124, and signals indicative of such estimations may be generated and used via payload determination system 152 and/or tipping avoidance controller 150.

As shown in FIG. 2, tipping avoidance system 140 may also include (and/or receive one or more signals from) one or more linkage position sensor(s) 206 configured to generate one or more signals indicative of at least one of (1) a position of a linkage of machine 102 (e.g., boom 122 and/or bucket 124) coupled to a payload holder of machine 102 (e.g., bucket 124), or (2) an orientation of the linkage relative to machine 102. Load position determination system 154, in some examples, may use such signals to determine an effective position of the payload, for example, relative to a center of gravity CG of machine 102 (e.g., without the payload). For example, linkage position sensor(s) 206 may include one or more sensors configured to generate one or more signals indicative of a pivot position of boom 122 relative to frame 120, and/or indicative of a pivot position of bucket 124 relative to boom 122. In some examples, one or more of linkage position sensor(s) 206 may be configured to generate one or more signals indicative of an extension (or retraction) length of a cylinder of boom actuator 128 and/or a cylinder of bucket actuator 130.

In some examples, tipping avoidance system 138 and/or tipping avoidance controller 150 may be configured to use one or more of the payload signal indicative of the payload or the signal indicative of at least one of (1) a position of a linkage of the machine coupled to a payload holder of the machine, or (2) an orientation of the linkage relative to the machine, to determine an effective center of gravity of machine 102 in its loaded condition (e.g., carrying material 126 in bucket 124) for the determined weight of the payload and the determined position of the payload. For example, relative to an unloaded condition, when machine 102 carries a payload of material 126 in bucket 124, the effective center of gravity of machine in its loaded state moves upward and forward (e.g., upward and to the left, as shown in FIG. 2), for example, when machine 102 is carrying the payload at an elevated position, as shown in FIG. 2. As the position of the payload changes upward (e.g., boom 122 is raised), the effective center of gravity moves higher relative to the unloaded center of gravity CG. As the payload is moved farther forward (e.g., the boom is positioned with the payload farther away for the front of cab 116, the effective center of gravity moves forward relative to the unloaded center of gravity CG. As the effective center of gravity moves forward and upward, the tendency of machine 102 to tip forward increases, and thus, some examples of tipping avoidance system 140 account for this, as described herein.

Example tipping avoidance system 140 may also include one or more of one or more speed sensor(s) 208, inclination sensor(s) 210, or a travel surface system 212. For example, example tipping avoidance system 140 shown in FIG. 2 also includes one or more speed sensor(s) 208 configured to generate one or more travel speed signals indicative of the travel speed TS at which machine 102 is travelling. Such speed sensor(s) 208 may include one or more known types of sensors for generating signals indicative of travel speed (e.g., wheel speed sensor(s), etc.). In some such examples, tipping avoidance controller 150 may be configured to receive one or more travel speed signals and determine, based at least in part on the payload signal, the load position signal, and/or the travel speed signal, the minimum stopping distance. For example, minimum stopping distance may increase in proportion to the travel speed TS of machine 102, and thus, in some examples, tipping avoidance system 140 may account for this, as described herein.

As shown in FIG. 2, some examples of tipping avoidance system 140 include one or more inclination sensor(s) 210 configured to generate one or more inclination signals indicative of inclination angle IA at which machine 102 is operating relative to level operation. One or more inclination sensor(s) 210 may include, for example, one or more accelerometers, one or more inertial measurement units, and/or other known sensors that may be configured to generate one or more signals indicative of inclination of an incline. In some examples, tipping avoidance controller 150 may be configured to receive one or more of the inclination signals and determine, based at least in part on the payload signal, the load position signal, and/or the inclination signal, the minimum stopping distance. If machine 102 is travelling down an incline, for example, as shown in FIG. 2, machine 102 may be more likely to tip forward due to braking, for example, due to activation of braking devices 146 by braking controller 144. Alternatively, if machine 102 is travelling up an incline, machine 102 may be less likely to tip forward due to braking, for example, due to activation of braking devices 146 by braking controller 144. Thus, in some examples, tipping avoidance system 140 may account for this, as described herein.

As shown in FIG. 2, some examples of tipping avoidance system 140 include travel surface system 212 configured to generate one or more surface characteristic signals indicative of one or more characteristics associated with a surface (e.g., of terrain 104) on which machine 102 travels. For example, machine 102 may include one or more imagers coupled thereto for generating images associated with surface characteristics of terrain 104, and computer vision techniques may be used to identify the surface characteristics. Some examples of travel surface system 212 may use other methods for generating signals indicative of characteristics associated with the surface, such as, operator-entered information (e.g., from an onboard operator or a remotely located operator). For example, a user interface may be provided to enter information indicative of one or more characteristics associated with the surface, which may be used by travel surface system 212 and/or tipping avoidance system 140. Example surface characteristics may relate to friction at one or more of front contact surface(s) 134 or rear contact surface(s) 136 between front wheel(s) 112 and/or rear wheel(s) 114 and the surface of terrain 104. For example, characteristics associated with the surface may relate to the material of the surface (e.g., asphalt, concrete, loose gravel, packed gravel, loose dirt, packed dirt, the presence of water, moisture, snow, and/or ice, etc.), any and/or all of which may affect braking distances and/or the tendency of machine 102 to tip forward due to braking, for example, due to activation of braking devices 146 by braking controller 144. In some examples, tipping avoidance controller 150 may be configured to receive the one or more surface characteristic signals and determine, based at least in part on the payload signal, the load position signal, and/or the surface characteristics signals, the minimum stopping distance. Thus, in some examples, tipping avoidance system 140 may account for this, as described herein.

Figure 3:
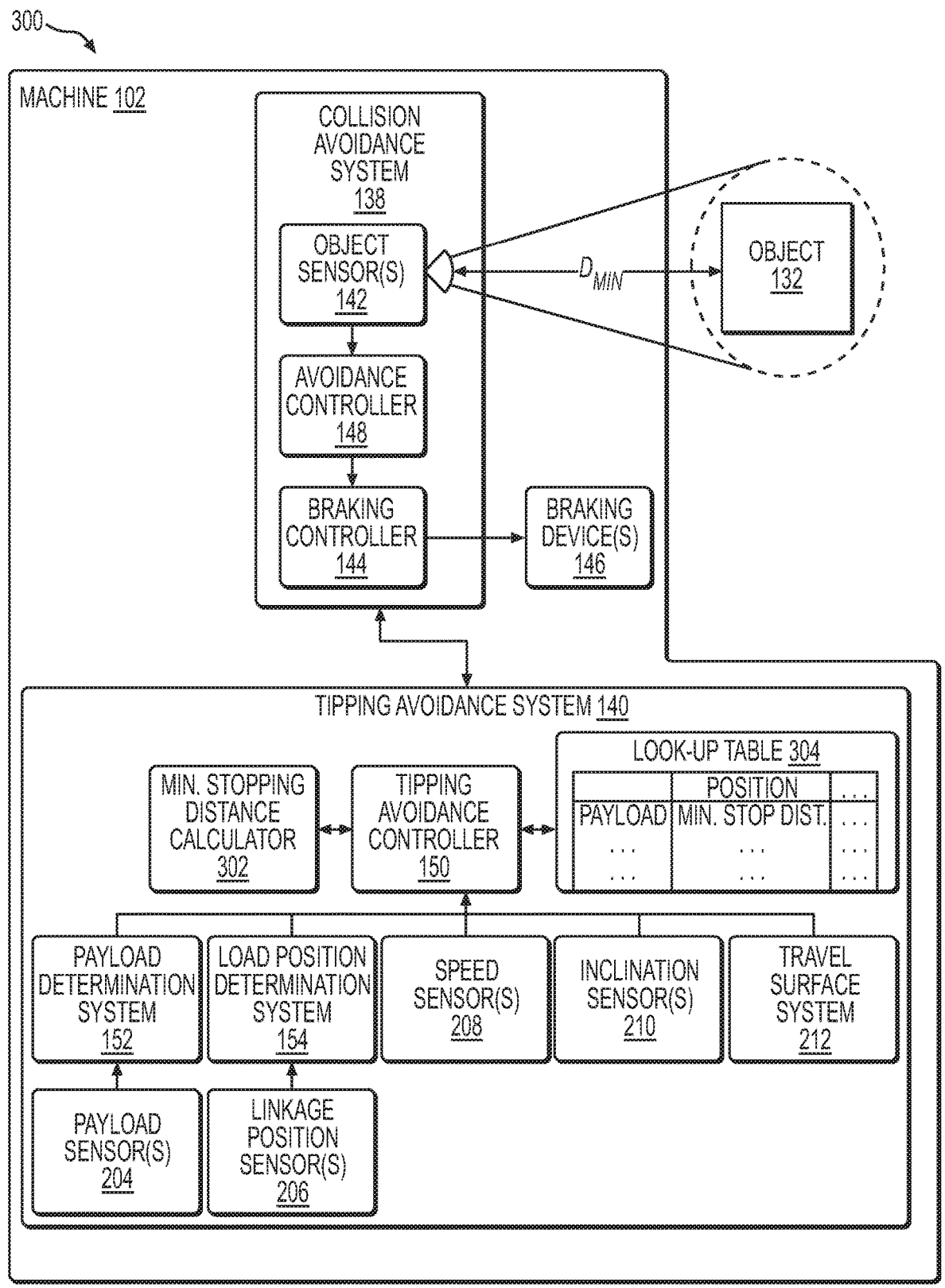
FIG. 3 schematically depicts an example machine control system architecture, including an example collision avoidance system and an example tipping avoidance system.

FIG. 3 schematically depicts an example machine control system architecture 300, including an example collision avoidance system 138 and an example tipping avoidance system 140. One or more of collision avoidance system 138 or tipping avoidance system 140 may include one or more processors, which may execute any modules associated with collision avoidance system 138 and/or tipping avoidance system 140 to cause collision avoidance system 138 and/or tipping avoidance system 140 to perform a variety of functions, as set forth above and explained in further detail herein. In some examples, the processor(s) may include a central processing unit (CPU), a graphics processing unit (GPU), both CPU and GPU, or other processing units or components known in the art. Additionally, each of the processors may possess its own local memory, which also may store program modules, program data, and/or one or more operating systems.

Computer-readable media associated with collision avoidance system 138 and/or tipping avoidance system 140 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with collision avoidance system 138 and/or tipping avoidance system 140. In some examples, one or more of the above-noted modules may include or be associated with computer-executable instructions that are stored by the computer-readable media and that are executable by one or more processors to perform such operations. Collision avoidance system 138 and/or tipping avoidance system 140 may also include additional components not listed above that may perform any function associated with collision avoidance system 138 and/or tipping avoidance system 140. Collision avoidance system 138 and/or tipping avoidance system 140 may communicate with one another using any known wired and/or wireless communication protocols and/or networks.

As shown in FIG. 3, example machine control system architecture 300 includes example collision avoidance system 138 and example tipping avoidance system 140. As shown in FIG. 3, example collision avoidance system 138 includes object sensor(s) 142 configured to generate one or more object signals indicative of an object 132 in the travel path of machine 102. Example collision avoidance system 138 shown in FIG. 3 also includes braking controller 144 configured to control activation of one or more braking devices 146 coupled to machine 102 and configured to slow a travel speed TS of machine 102, stop machine 102, and/or hold machine 102 at a fixed location on terrain 104. Example collision avoidance system 138 shown in FIG. 3 also includes avoidance controller 148 configured to receive the one or more object signals from one or more object sensors 142 and, in some examples, determine whether the object is in the path of machine 102. Based at least in part on the one or more object signals (e.g., based at least in part upon determining the object is in the path), avoidance controller 146, in some examples, may be configured to activate one or more of one or more braking devices 146, for example, such that the travel speed TS of machine 102 is reduced and/or stopped, for example, as described herein. In this example manner, collision avoidance system 138 may sense an object in the path of machine 102, and upon detection cause activation of one or more of braking devices 146, for example, so that machine 102 avoids collision with the detected object and/or assists an operator of machine 102 with avoiding the detected object, for example, by slowing the travel speed TS of machine 102 and/or stopping machine 102 before machine 102 collides with the detected object.

Example tipping avoidance system 140 shown in FIG. 3 may be configured to modify operation of collision avoidance system 138, for example, as described herein. In the example shown in FIG. 3, tipping avoidance system 140 (e.g., tipping avoidance controller 150) may be configured to determine a minimum stopping distance by calculating the minimum stopping distance based at least in part on one or more payload signals and/or one or more load position signals. For example, tipping avoidance system 140 may include a minimum stopping distance calculator 302 configured to calculate the minimum stopping distance based at least in part on one or more payload signals and/or one or more load position signals. In some examples, minimum stopping distance calculator 302 may be configured to calculate the minimum stopping distance based at least in part on one or more of one or more travel speed signals (e.g., from speed sensor(s) 208), one or more inclination signals (e.g., from inclination sensor(s) 210), or one or more surface characteristic signals indicative of a characteristic associated with a surface on which machine 102 travels (e.g., from travel surface system 212). In some examples, tipping avoidance system 140 (e.g., tipping avoidance controller 150) may be configured to determine the minimum stopping distance using (e.g., via accessing memory including) one or more look-up tables 304 including correlations between the minimum stopping distance and the payload carried by the machine and the position of the payload relative to the machine. In some such examples, tipping avoidance system 140 may be configured to determine the minimum stopping distance using look-up table 304, which may include correlations between minimum stopping distance and at least one of one or more travel speed signals (e.g., from speed sensor(s) 208), one or more inclination signals (e.g., from inclination sensor(s) 210), or one or more surface characteristic signals indicative of a characteristic associated with a surface on which machine 102 travels (e.g., from travel surface system 212). In some examples, one or more look-up tables 304 may correlate the minimum stopping distance with at least one of the payload carried by machine 102, the position of the payload relative to machine 102, the travel speed of machine 102, the inclination angle at which machine 102 is operating relative to level operation, or one or more characteristics associated with the surface on which machine 102 is travelling.

In some examples, one or more of the correlations related to minimum stopping distance may be calculated real-time based on known principles of physics and information obtained from sensors associated with machine 102, and/or may be empirically determined based on, for example, testing and/or known principles of physics. When the minimum stopping distance is at least partially empirically determined, empirically-based minimum stopping distances may be correlated with machine-related parameters in one or more look-up tables, for example, such as example look-up 304.

Figure 4:
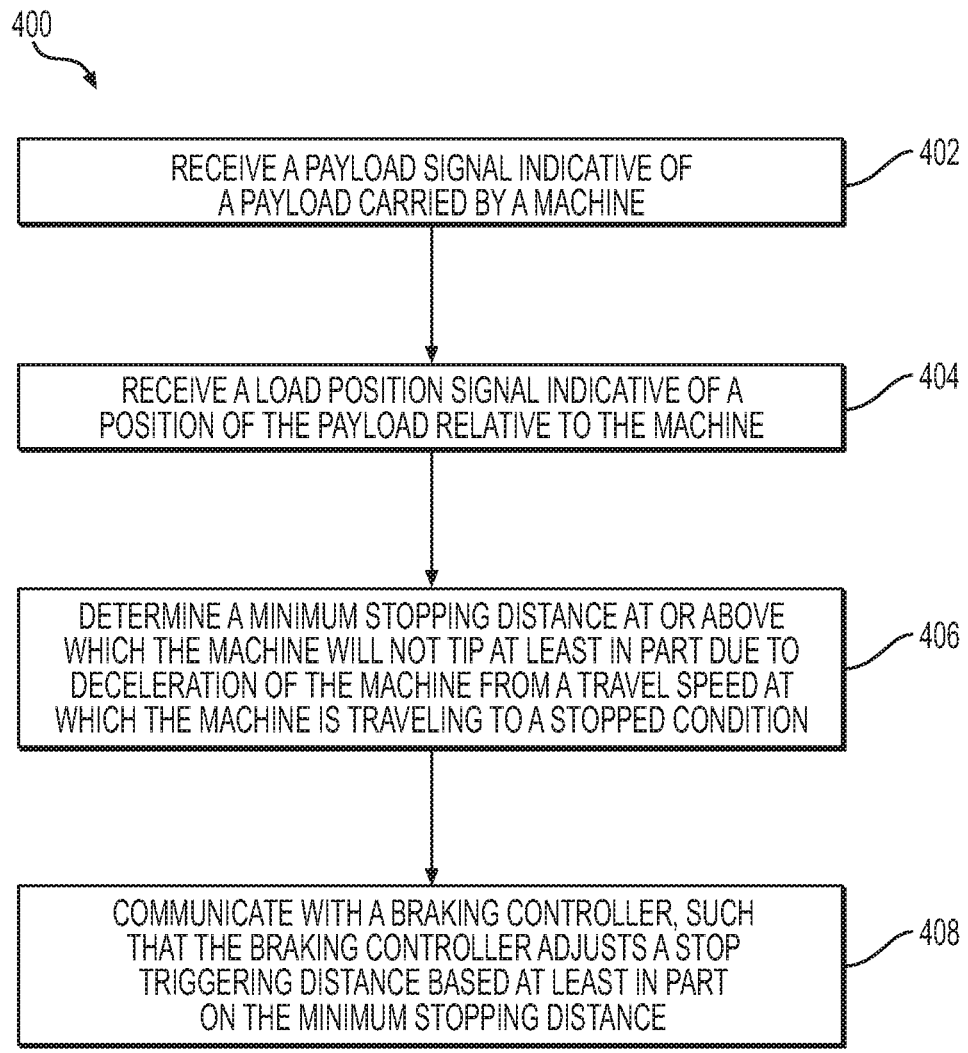
FIG. 4 is a block diagram of an example process for modifying operation of a collision avoidance system to avoid tipping of the machine during braking.

FIG. 4 illustrates an example process for modifying operation of a collision avoidance system associated with a machine. This process is illustrated as a logical flow graph, operation of which represents a sequence of operations, at least some of which may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 illustrates a flow diagram of an example process 400 for modifying operation of a collision avoidance system associated with a machine. The following actions described with respect to FIG. 4 may be performed, for example, as illustrated with respect to FIGS. 1-3. The example process 400, at 402, may include receiving a payload signal indicative of a payload carried by a machine, for example, as described herein. In some examples, one or more sensors coupled to the machine may be configured to generate one or more payload signals indicative of a payload carried by the machine. In some examples, the payload signal may be received by a tipping avoidance system including a tipping avoidance controller, for example, as described herein.

The example process 400, at 404, may include receiving a load position signal indicative of a position of the payload relative to the machine, for example, as described herein. In some examples, one or more sensors coupled to the machine may be configured to generate one or more load position signals indicative of the position of the payload relative to the machine (e.g., the center of gravity of the machine). In some examples, the load position signals may be received by the tipping avoidance system including the tipping avoidance controller, for example, as described herein.

The example process 400, at 406, may include determining, based at least in part on the payload signal and the load position signal, a minimum stopping distance at or above which the machine will not tip due at least in part to deceleration of the machine from the travel speed at which the machine is traveling to a stopped condition. In some examples, the tipping avoidance system (e.g., the tipping avoidance controller) may be configured to determine the minimum stopping distance, for example, as described herein. In some examples, determining the minimum stopping distance may include at least one of (1) calculating the minimum stopping distance based at least in part on the payload signal and the load position signal, or (2) using a look-up table including correlations between the minimum stopping distance and the payload carried by the machine and the position of the payload relative to the machine. In some examples, the process 400 may also include receiving an inclination signal indicative of an inclination angle at which the machine is operating relative to level operation, and determining the minimum stopping distance may include determining the minimum stopping distance based at least in part on the payload signal, the load position signal, and/or the inclination signal. In some examples, the process 400 may include receiving a surface characteristic signal indicative of a characteristic associated with a surface on which the machine travels, and determining the minimum stopping distance may include determining the minimum stopping distance based at least in part on the payload signal, the load position signal, and/or the surface characteristics signal.

The example process 400, at 408, may also include communicating with a braking controller (e.g., of a collision avoidance system), such that the braking controller adjusts a stop triggering distance based at least in part on the minimum stopping distance, for example, as described herein.

INDUSTRIAL APPLICABILITY

The exemplary systems and related methods of the present disclosure may be applicable to a variety of machines, for example, any machine configured to travel across terrain, such as, for example, an automobile, a truck, an agricultural vehicle, and/or construction vehicles, such as, for example, a wheel loader, a track loader, a dozer, a skid-steer loader, a grader, an on-highway truck, an off-highway truck, and/or any other machine known to a person skilled in the art. For example, some machines may include a collision avoidance system configured to assist a machine operator (e.g., aboard the machine or remote from the machine), or an autonomous machine, with avoiding collisions with other machines, people, and/or objects. For example, a collision avoidance system may include a braking controller configured to control activation of one or more braking devices coupled to the machine and configured to slow a travel speed of the machine, stop the machine, and/or hold the machine at a fixed location on the supporting terrain. For example, the braking controller may be configured to reduce a travel speed at which the machine maneuvers by activating one or more of the braking devices. In some examples, a collision avoidance system may also include an avoidance controller configured to receive an object signal from the one or more object sensors and determine whether an object is in the path of the machine, and upon determining the object is in the path, the avoidance controller, in some examples, may be configured to activate one or more of the one or more braking devices, for example, such that the travel speed of the machine is reduced and/or stopped. In this example manner, a collision avoidance system may sense an object in the path of the machine, and upon detection, cause activation of one or more of the braking devices, so that the machine avoids collision with the detected object and/or assists an operator of the machine with avoiding the detected object, for example, by slowing the travel speed of the machine and/or stopping the machine before the machine collides with the detected object.

Under certain circumstances, for example, depending one or more of payload, load position, or other parameters, braking of a machine by a collision avoidance system may result in the machine tipping forward in the direction of travel. For example, as shown in FIG. 1, if machine 102 is travelling forward (e.g., from right-to-left as shown) at a travel speed TS and carrying a payload of material 126, if deceleration due to braking is sufficiently high, machine 102 may have a tendency to tip forward, for example, rotating about front contact surface(s) 134 between front wheel(s) 112 and terrain 104, such that rear wheel(s) 114 lift off terrain 104, which is undesirable.

In some examples, tipping avoidance system 140, which may be configured to modifying operation of a collision avoidance system, for example, may reduce the likelihood or prevent braking due to operation of the collision avoidance system from causing machine 102 to tip forward, such that machine 102 rotates about front contact surface(s) 134 between front wheel(s) 112 and terrain 104, such that rear wheel(s) 114 lift off terrain 104. For example, as shown in FIG. 1, some examples of tipping avoidance system 140 may include a tipping avoidance controller 150 configured to be in communication with collision avoidance system 138. In some examples, tipping avoidance controller 150 may be configured to receive a payload signal indicative of a payload carried by machine 102. For example, as shown in FIG. 1, tipping avoidance system 140 may include a payload determination system 152 configured to generate a signal indicative of a payload carried by machine 102, such as, for example, weight of material 126 carried in bucket 124 (e.g., a force F due to gravity). In some examples, tipping avoidance controller 150 may be configured to receive a load position signal indicative of a position of the payload relative to machine 102. For example, as shown in FIG. 1, tipping avoidance system 140 may include a load position determination system 154 configured to generate a signal indicative of a load position of the payload carried by machine 102, such as, for example, a location relative to machine 102 of material 126 carried in bucket 124. The position of the load carried by machine 102 may affect the center of gravity of machine 102, which may, in turn, affect the tendency of machine 102 to tip forward when braking.

In some examples, tipping avoidance controller 150 may be configured to determine, based at least in part on the payload signal and the load position signal, a minimum stopping distance at or above which machine 102 will not tip due at least in part to deceleration of machine 102 from the travel speed at which machine 102 is traveling to a stopped condition. In some examples, the minimum stopping distance may be calculated real-time based on known principles of physics and information obtained from sensors associated with machine 102, and/or may be empirically determined based on, for example, testing and/or known principles of physics. When the minimum stopping distance is at least partially empirically determined, empirically-based minimum stopping distances may be correlated with machine-related parameters in one or more look-up tables, for example, as described herein, and the minimum stopping distance may be determined based on one or more of the machine-related parameters. In some such examples, tipping avoidance controller 150 may be configured to communicate with collision avoidance system 138, such that collision avoidance system 138 adjusts a stop triggering distance based at least in part on the minimum stopping distance. For example, the stop triggering distance may correspond to (e.g., may be equal to or equal to as modified by a safety factor) the minimum stopping distance, and may be the distance at which, when object sensor(s) 142 detect object 132 in the travel pat of machine 102, collision avoidance system 138 causes activation of braking devices 146 to stop machine 102. In some examples, tipping avoidance controller 150 may communicate with collision avoidance system 138, such that braking controller 144 does not cause braking devices 146 to attempt to stop machine 102 in a distance less than or equal to the minimum stopping distance. In some examples, braking controller 144 may activate braking devices 146 according to a tipping avoidance profile, such that braking devices 146 do not attempt to stop machine 102 in a distance less than or equal to the minimum stopping distance.

In some examples, tipping avoidance system 140 may also include one or more of one or more speed sensor(s) 208, inclination sensor(s) 210, or a travel surface system 212. In some such examples, tipping avoidance controller 150 may be configured to receive one or more travel speed signals and determine, based at least in part on the payload signal, the load position signal, and/or the travel speed signal, the minimum stopping distance. For example, minimum stopping distance may increase in proportion to the travel speed TS of machine 102, and thus, in some examples, tipping avoidance system 140 may account for this, as described herein.

Some examples of tipping avoidance system 140 include one or more inclination sensor(s) 210 configured to generate one or more inclination signals indicative of inclination angle IA at which machine 102 is operating relative to level operation. If machine 102 is travelling down an incline, for example, as shown in FIG. 2, machine 102 may be more likely to tip forward due to braking, for example, due to activation of braking devices 146 by braking controller 144. Alternatively, if machine 102 is travelling up an incline, machine 102 may be less likely to tip forward due to braking, for example, due to activation of braking devices 146 by braking controller 144. Thus, in some examples, tipping avoidance system 140 may account for this, as described herein.

Some examples of tipping avoidance system 140 include travel surface system 212 configured to generate one or more surface characteristic signals indicative of one or more characteristics associated with a surface (e.g., of terrain 104) on which machine 102 travels. Example characteristics associated with a surface may relate to friction at one or more of front contact surface(s) 134 or rear contact surface(s) 136 between front wheel(s) 112 and/or rear wheel(s) 114 and the surface of terrain 104. For example, characteristics associated with the surface may relate to the material of the surface (e.g., asphalt, concrete, loose gravel, packed gravel, loose dirt, packed dirt, the presence of water, moisture, snow, and/or ice, etc.), any and/or all of which may affect braking distances and/or the tendency of machine 102 to tip forward due to braking, for example, due to activation of braking devices 146 by braking controller 144. In some examples, tipping avoidance controller 150 may be configured to receive the one or more surface characteristic signals and determine, based at least in part on the payload signal, the load position signal, and/or the surface characteristics signals, the minimum stopping distance. Thus, in some examples, tipping avoidance system 140 may account for this, as described herein.

In some examples, the tipping avoidance system and/or related methods may modify operation of the collision avoidance system, for example, to reduce the likelihood, or prevent, a machine from tipping forward during braking caused, for example, by a collision avoidance system. For example, the tipping avoidance system or related methods may communicate with the collision avoidance system, such that braking caused by the collision avoidance system is controlled to reduce the likelihood, or prevent, the machine from tipping forward, for example, as described herein.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A tipping avoidance system comprising:
   a payload determination system configured to generate a payload signal indicative of a payload being carried by a machine;
   a load position determination system configured to generate a load position signal indicative of a position of the payload relative to the machine; and
   a tipping avoidance controller configured to:
   receive the payload signal;
   receive the load position signal;
   determine, based at least in part on the payload signal and the load position signal and during forward movement of the machine, a minimum stopping distance over which the forward movement must continue to avoid tipping, the tipping being due at least in part to deceleration of the machine from a travel speed at which the machine is traveling to a stopped condition; and
   communicate with a braking controller, such that the braking controller adjusts a stop triggering distance for a collision avoidance system to equal or exceed the minimum stopping distance and precludes the collision avoidance system from stopping the machine at a distance less than the minimum stopping distance.

2. The tipping avoidance system of claim 1, further comprising at least one inclination sensor configured to generate an inclination signal indicative of an inclination angle at which the machine is operating relative to level operation, and wherein the tipping avoidance controller is configured to receive the inclination signal and determine the minimum stopping distance, based at least in part on the payload signal, the load position signal, and the inclination signal.

3. The tipping avoidance system of claim 1, further comprising a travel surface system configured to generate a surface characteristic signal based on images received from an imager indicative of a characteristic associated with a surface on which the machine travels, and wherein the tipping avoidance controller is configured to receive the surface characteristic signal during operation of the machine and determine the minimum stopping distance, based at least in part on the payload signal, the load position signal, and the surface characteristics signal.

4. The tipping avoidance system of claim 1, further comprising a speed sensor configured to generate a travel speed signal indicative of a speed at which the machine is travelling, and wherein the tipping avoidance controller is configured to receive the travel speed signal and determine the minimum stopping distance, based at least in part on the payload signal, the load position signal, and the travel speed signal.

5. The tipping avoidance system of claim 1, wherein the payload determination system comprises a payload sensor configured to generate the payload signal indicative of the payload.

6. The tipping avoidance system of claim 1, wherein the load position determination system comprises a linkage position sensor configured to generate a signal indicative of at least one of (1) a position of a linkage of the machine coupled to a payload holder of the machine, or (2) an orientation of the linkage relative to the machine.

7. The tipping avoidance system of claim 1, wherein the tipping avoidance controller is configured to determine the minimum stopping distance by at least one of (1) calculating the minimum stopping distance based at least in part on the payload signal and the load position signal, or (2) using a look-up table including correlations between the minimum stopping distance and the payload carried by the machine and the position of the payload relative to the machine.

8. A control system for a machine, the control system comprising:
   a collision avoidance system configured to assist the machine with avoiding a collision between the machine and an object in an environment through with the machine maneuvers along a path, the collision avoidance system comprising:
   at least one object sensor configured to generate an object signal indicative of an object;
   a braking controller configured to control activation of a braking device coupled to the machine, the braking controller configured to reduce a travel speed at which the machine maneuvers; and
   an avoidance controller configured to:
   receive the object signal from the at least one object sensor; and
   based at least in part on the object signal, activate the braking device, such that the travel speed of the machine is at least one of reduced or stopped; and
   a tipping avoidance system configured to modify operation of the collision avoidance system of a machine, the tipping avoidance system comprising:
   a tipping avoidance controller configured to:
   receive a payload signal indicative of a payload carried by the machine;
   receive a load position signal indicative of a position of the payload relative to the machine;
   determine, based at least in part on the payload signal and the load position signal as the machine maneuvers in forward movement along the path, a minimum stopping distance over which the forward movement must continue to avoid tipping, the tipping being due at least in part to deceleration of the machine from the travel speed at which the machine is traveling to a stopped condition; and
   communicate with the braking controller, such that the braking controller adjusts a stop triggering distance for the collision avoidance system to equal or exceed the minimum stopping distance and precludes the collision avoidance system from stopping the machine at a distance less than the minimum stopping distance.

9. The control system of claim 8, wherein the at least one object sensor comprises at least one of an imager, a light detection and ranging (LIDAR) sensor, a sound navigation ranging (SONAR) sensor, or a radio detection and ranging (RADAR) sensor.

10. The control system of claim 8, wherein the braking controller is configured to activate the braking device according to one of a first braking profile configured to provide a maximum available braking force, a second braking profile configured to provide an intermediate level braking force, and a third braking profile configured to provide a modified level braking force less than the intermediate level braking force based at least in part on the minimum stopping distance.

11. The control system of claim 8, further comprising at least one inclination sensor configured to generate an inclination signal indicative of an inclination angle at which the machine is operating relative to level operation, wherein the tipping avoidance controller is configured to receive the inclination signal and determine the minimum stopping distance, based at least in part on the payload signal, the load position signal, and the inclination signal.

12. The control system of claim 8, further comprising a travel surface system configured to generate a surface characteristic signal based on images received from an imager indicative of a characteristic associated with a surface on which the machine travels, wherein the tipping avoidance controller is configured to receive the surface characteristic signal and determine the minimum stopping distance, based at least in part on the payload signal, the load position signal, and the surface characteristics signal.

13. The control system of claim 8, further comprising a speed sensor configured to generate a travel speed signal indicative of a speed at which the machine is travelling, wherein the tipping avoidance controller is configured to receive the travel speed signal and determine the minimum stopping distance, based at least in part on the payload signal, the load position signal, and the travel speed signal.

14. The control system of claim 8, further comprising a payload determination system configured to generate the payload signal indicative of the payload carried by the machine, wherein the payload determination system comprises a payload sensor configured to generate the payload signal indicative of the payload.

15. The control system of claim 8, further comprising a load position determination system configured to generate a load position signal indicative of a position of the payload relative to the machine, wherein the load position determination system comprises a linkage position sensor configured to generate a signal indicative of at least one of (1) a position of a linkage of the machine coupled to a payload holder of the machine, or (2) an orientation of the linkage relative to the machine.

16. The control system of claim 8, wherein the tipping avoidance controller is configured to determine the minimum stopping distance by at least one of (1) calculating the minimum stopping distance based at least in part on the payload signal and the load position signal, or (2) using a look-up table including correlations between the minimum stopping distance and the payload carried by the machine and the position of the payload relative to the machine.

17. A method for modifying operation of a collision avoidance system associated with a machine, the method comprising:
receiving a payload signal indicative of a payload being carried by a machine;
receiving a load position signal indicative of a position of the payload relative to the machine;
determining, based at least in part on the payload signal and the load position signal and during forward movement of the machine, a minimum stopping distance over which the forward movement must continue to avoid tipping, the tipping being due at least in part to deceleration of the machine from a travel speed at which the machine is traveling to a stopped condition; and
communicating with a braking controller, such that the braking controller adjusts a stop triggering distance for the collision avoidance system to equal or exceed the minimum stopping distance and precludes the collision avoidance system from stopping the machine at a distance less than the minimum stopping distance.

18. The method of claim 17, wherein determining the minimum stopping distance comprises at least one of (1) calculating the minimum stopping distance based at least in part on the payload signal and the load position signal, or (2) using a look-up table including correlations between the minimum stopping distance and the payload carried by the machine and the position of the payload relative to the machine.

19. The method of claim 17, further comprising receiving an inclination signal indicative of an inclination angle at which the machine is operating relative to level operation, wherein determining the minimum stopping distance comprises determining the minimum stopping distance based at least in part on the payload signal, the load position signal, and the inclination signal.

20. The method of claim 17, further comprising receiving a surface characteristic signal based on images received from an imager indicative of a characteristic associated with a surface on which the machine travels, wherein determining the minimum stopping distance comprises determining the minimum stopping distance based at least in part on the payload signal, the load position signal, and the surface characteristics signal.

\* \* \* \* \*